Feb. 3, 1959    J. McCONNELL    2,871,816
READING GUIDES FOR FIGURES IN LINES AND COLUMNS
Filed Nov. 29, 1957    2 Sheets-Sheet 1

INVENTOR.
JOSEPH McCONNELL,
BY
McMorrow, Berman & Davidson
ATTORNEYS.

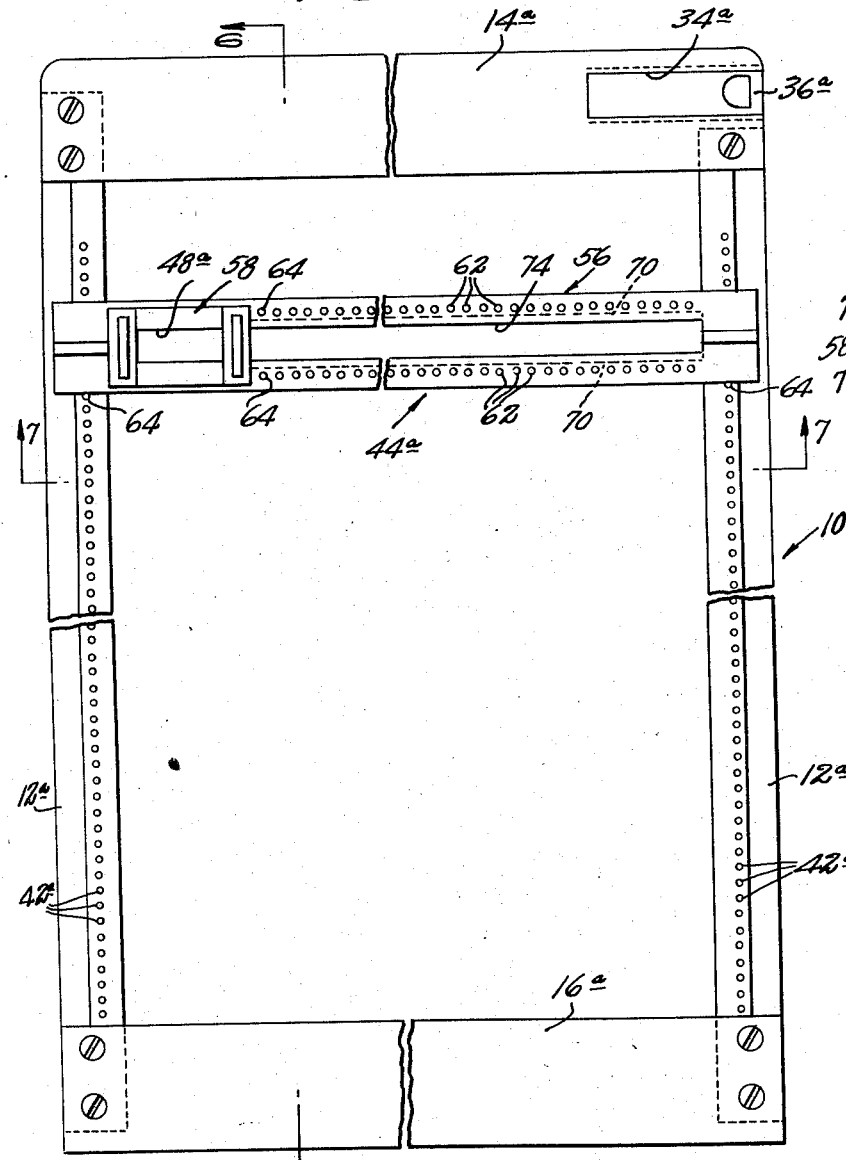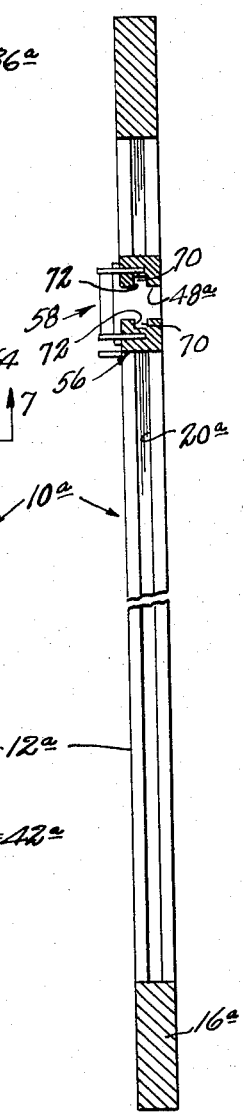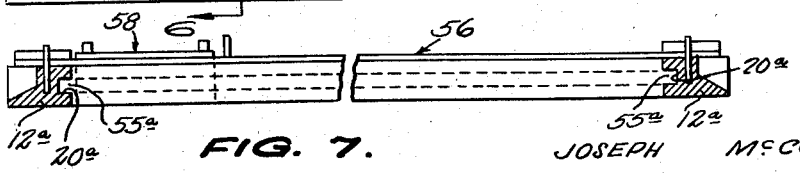

United States Patent Office 2,871,816
Patented Feb. 3, 1959

2,871,816

READING GUIDES FOR FIGURES IN LINES AND COLUMNS

Joseph McConnell, Toronto, Ontario, Canada

Application November 29, 1957, Serial No. 699,653

6 Claims. (Cl. 116—119)

This invention relates to reading guides for figures in lines and columns and the like on columnar sheets and the like.

The primary object of the invention is to provide more practical and efficient guides of this kind, for use by bookkeepers, accountants, inventory clerks and others, whereby rapid and acurate selection and reading off of selected figures present in lines and columns on columnar sheets are made easy.

Another object of the invention is to provide guides of the kind indicated which are simple in construction and are composed of a small number of simple and easily assembled parts, and whose movable components can be quickly, easily, and accurately moved relative to the stationary components and positioned thereon in selected fixed positions.

A further important object of the invention is to provide guides of the character indicated above which can be made in well-finished, rugged, and serviceable forms at relatively low cost.

Other important objects and advantageous features of the invention will be apparent from the following description and the accompanying drawings, wherein, for purposes of illustration only, a specific form of the invention is set forth in detail.

In the drawings:

Figure 5 is a contracted plan view of another form of the invention;

Figure 6 is a longitudinal section taken on the line 6—6 of Figure 5; and

Figure 7 is a contracted transverse section taken on the 7—7 of Figure 5.

Referring in detail to the drawings, wherein like or similar numerals designate like parts throughout the several views, and first to Figures 1 to 4, the one-column guide therein shown, and generally designated 10, comprises two similar elongated side rails 12, 12 which are parallel spaced at a distance approximating the width of a single column of figures, on a sheet or the like (not shown), the side rails 12 being spaced and connected at their upper and lower ends by upper and lower cross members 14 and 16, respectively.

Figure 1:
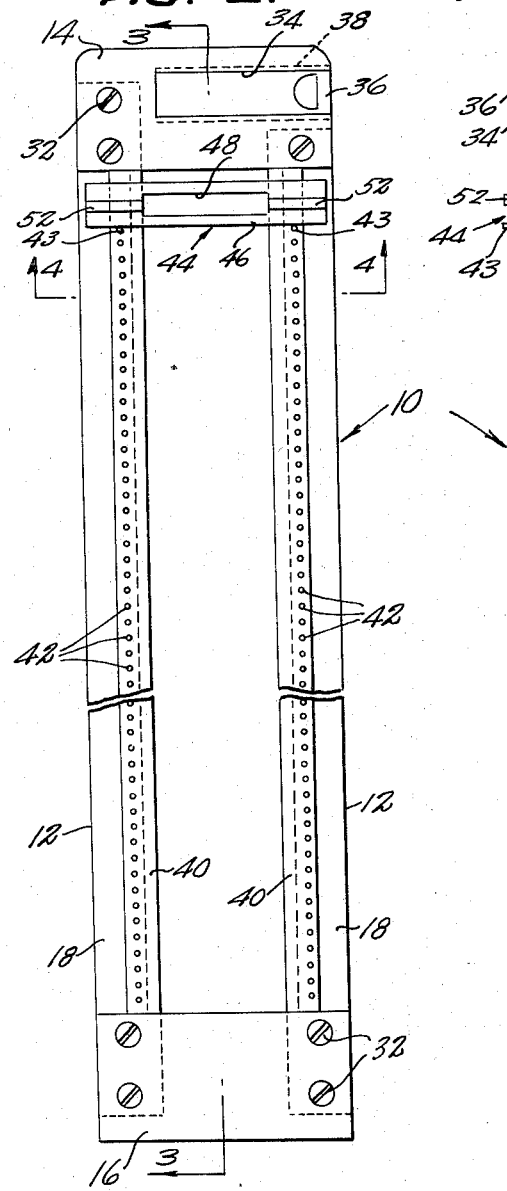
Figure 1 is a plan view of one form of the invention.
Figure 2:
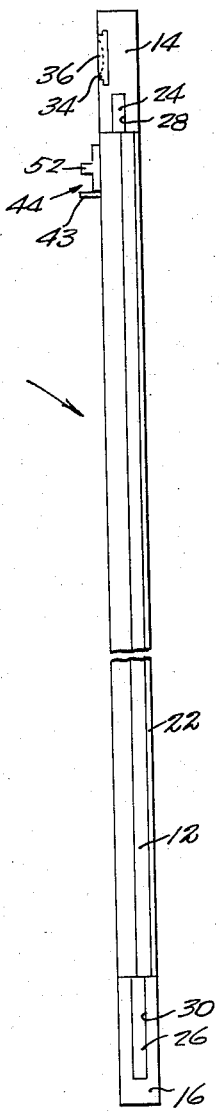
Figure 2 is a right-hand edge view of Figure 1.
Figure 3:
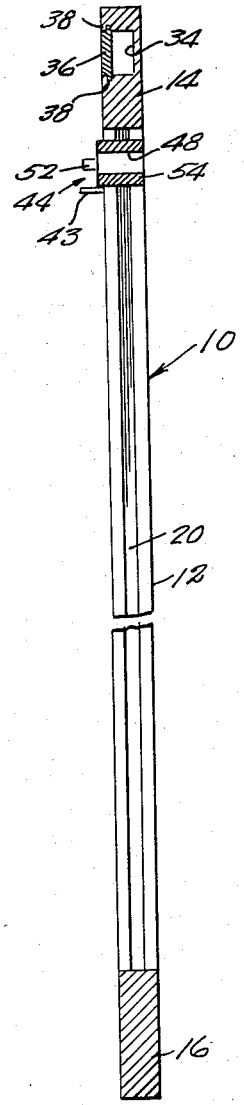
Figure 3 is a longitudinal section taken on the line 3—3 of Figure 1.
Figure 4:
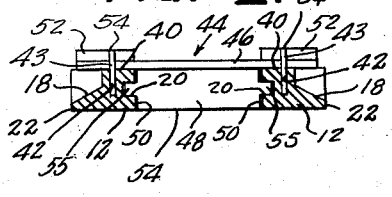
Figure 4 is a transverse section taken on the line 4—4 of Figure 1.

The side rails 12, are preferably of rectangular cross section, and, as shown in Figure 4, have their upper outer corners reduced to define outwardly declined bevels 18 facilitating handing and manipulating of the guide. The inward sides or edges of the side rails 12 have therein longitudinal grooves 20. The side rails 12 being made of any suitable metal or non-metallic material. The outer edges 22 defined by the bevels 18, define orientating edges, for reference to vertical readings on such as a columnar sheet. The related ends of the side rails 12 have thereon reduced tongues 24 and 26 which are engaged in slots 28 and 30 in the inward edges of the cross members 14 and 16. Heade rivets or the like 32 traverse the cross members and the tongues to secure the assembly. A transverse recess 34 is provided in the upper surface of the upepr cross member 14, for accommodating pegs, herein after described, and is closed by a slide cover 36 engaged in grooves 38 in the sides of the recess 34.

In the upper surface 40 of the side rails 12 and spaced uniformly therealong are peg holes 42, the peg holes 42 being aligned with each other crosswise of the guide 10. Pegs 43 are provided to be removably engaged in holes 42.

The guide 10 further includes a single figure guide block or plate, generally designated 44, which comprises an elongated flat bar 46 of a length to reach over and beyond the upper surfaces 40 of the side rails 12. The bar 46 has a longitudinal, single figure exposing slot 48 spaced from its ends, which is the same in length as the column width distance between the inner edges 50 of the side rails. Finger grips 52 are secured longitudinally on the top of the bar 46 outwardly of the ends of the slot 48, for manipulating the guid block 44. The portion 54 of the bar 46 between the side rails is thickened and contains the slot 48 and has tongues 55 on its ends slidably engaged in the grooves 20 of the side rails. Pegs 43 are placed in holes 42 at one side of the guide block 44 for positioning the guide block 44 for the reading through its slot 48 of a selected single figure in a single column on a columnar sheet.

The form of the invention shown in Figures 5 to 7, and generally designated 10a, for selectively reading different single figures in several different columns, one at a time, is generally similar to Figures 1 to 4, except that the side rails 12a, 12a are sufficiently laterally spaced from each other to comprehend the fully width of such as a columnar sheet, and the guide block means, generally designated 44a, includes a vertically adjustable guide block 56, and a transversely adjustable column selecting, single figure guide block 58.

The guide block 56, which is necessarily longer than the guide block 44 of Figures 1 to 4, is generally the same in structure, except for the presence in its upper side 60 of two rows of uniformly spaced peg holes 62.

The guide block 58 is shorter than but similar in structure to the guide blocks 44, 56, except that the guide block 58 is positioned on the block 56 by pegs 64 which are selectively engageable in aligned peg holes 62 of the guide bar 56. The guide block 56 is selectively positioned on the side rails and held in position by pegs 64 in holes 42a to select the desired line of figures on a sheet, and the guide block 58 is then moved along the guide block 56 to a position over the desired column of figures, so as to expose a single figure therein.

The guide block 48a has tongues 70 along its upper and lower edges which are slidably confined in grooves 72 in the sides of a longitudinal slot 74 in the guide block 44a; and the block 44a has tongues 55a on its ends slidably engaged in the grooves 20a of the side rails 12a.

Although I have shown and described herein specific embodiments of my invention, it is to be understood that any change or changes in the forms of and in the relative arrangements of components thereof are contemplated as being within the scope of the invention as defined by the claims appended hereto.

What is claimed is:

1. A reading guide for figures in lines and columns of columnar sheets comprising a pair of elongated parallel spaced side rails having top sides and upper and lower ends, cross members extending between and fixed to the side rails at their upper and lower ends, and guide block means extending between and resting upon the top sides of the side bars and slidably confined on the side rails, and abutment peg means on the side rails for holding the guide block means in selected positions along the side bars.

2. A reading guide for figures in lines and columns of columnar sheets according to claim 1, wherein said guide block means comprises a bar longer than the space between the side rails, said bar having thereon a longitudinal single figure exposing slot.

3. A reading guide for figures in lines and columns of columnar sheets according to claim 1, wherein said peg means comprises pegs, and rows of uniformly and longitudinally spaced peg holes in the top sides of said side rails.

4. A reading guide for figures in lines and columns of columnar sheets according to claim 1, wherein said guide block means comprises a first line guide block resting upon and extending between the top sides of the side rails and having thereon a single longitudinal line-exposing slot, said first block having a top side, and a second single figure guide block resting upon the top side of and slidably confined on said first block, and peg means acting between said second block and said first block for holding the second block in a longitudinally adjusted position on said first block.

5. A reading guide for figures in lines and columns of columnar sheets according to claim 1, wherein said peg means comprises pegs, and rows of uniformly and longitudinally spaced peg holes in the top sides of said side rails, said pegs being removably and selectively engageable in peg holes to form positioning abutments for the guide block means.

6. A reading guide for figures in lines and columns of columnar sheets according to claim 1, wherein said guide block means comprises a first line guide block resting upon and extending between the top sides of the side rails and having thereon a single longitudinal line-exposing slot, said first block having a top side, and a second single figure guide block resting upon the top side of and slidably confined on said first block, and peg means acting between said second block and said first block for holding the second block in a longitudinally adjusted position on said first block, said peg means comprising pegs removably and selectively engageable in holes provided in said side rails and said first guide block to serve as positioning abutments for said first and second blocks.

References Cited in the file of this patent

UNITED STATES PATENTS

| 1,405,793 | Marshall | Feb. 7, 1922 |
| 1,958,743 | Connor | May 15, 1934 |
| 2,117,372 | Smith | May 17, 1938 |
| 2,585,421 | Dumais | Feb. 12, 1952 |

FOREIGN PATENTS

| 439,834 | Italy | Oct. 1, 1948 |